United States Patent [19]
Lamming et al.

[11] Patent Number: 6,144,997
[45] Date of Patent: Nov. 7, 2000

[54] SYSTEM AND METHOD FOR ACCESSING AND DISTRIBUTING ELECTRONIC DOCUMENTS

[75] Inventors: Michael Lamming; Michael J. Flynn, both of Cambridge, United Kingdom

[73] Assignee: Xerox Corporation, Stamford, Conn.

[21] Appl. No.: 09/181,715

[22] Filed: Oct. 28, 1998

Related U.S. Application Data

[63] Continuation of application No. 08/493,376, Jun. 21, 1995.

[30] Foreign Application Priority Data

Jun. 27, 1994 [GB] United Kingdom .................... 9412871
Dec. 12, 1994 [GB] United Kingdom .................... 9425184

[51] Int. Cl.[7] ..................................................... G06F 15/16
[52] U.S. Cl. .......................... 709/217; 709/200; 709/206; 707/500
[58] Field of Search ..................................... 709/217, 206, 709/200; 707/500

[56] References Cited

U.S. PATENT DOCUMENTS

| | | | |
|---|---|---|---|
| 5,278,673 | 1/1994 | Scapa et al. ............................. | 358/473 |
| 5,339,239 | 8/1994 | Manabe et al. ......................... | 364/401 |
| 5,465,038 | 11/1995 | Register ..................................... | 320/2 |
| 5,520,470 | 5/1996 | Willett ...................................... | 400/88 |
| 5,581,752 | 12/1996 | Inoue et al. ............................. | 395/601 |

FOREIGN PATENT DOCUMENTS

| | | |
|---|---|---|
| 1 487 507 | 10/1977 | United Kingdom . |
| WO 94/12938 | 6/1994 | WIPO . |

OTHER PUBLICATIONS

Adams, N., Gold R., Schilit B., Tso M. and Want, R., "An Infrared Network for Mobile Computers," Proceedings of USENIX Symposium on Mobile and Location–independent Computing, pp. 41–52, Cambridge, MA, Aug. 1993, USENIX Association.

Lamming, Michael G., "Towards Future Personalised Information Environments," Feb. 2, 1994, pp. 1–3..

Lloyd, C., "Portable PCs Communicate by Infra–red," The Times, Jun. 12, 1994.

Martinez, S., "A Cooperative Information Storage and Retrieval System for the Petroleum Industry," Journal of Chemical Documentation, vol. 13, No. 2, 1973, pp. 59–65.

Schilit, B., Adams, N., and Want, R., "Context–Aware Computing Applications," Proceedings Workshop on Mobile Computing Systems and Applications, Santa Cruz, California Dec. 1994, pp. 1–9.

Schilit, B., Theimer, M., and Welch, B., "Customizing Mobile Applications," Proceedings of USENIX Symposium on Mobile and Location–independent Computing, Aug. 1993, pp. 1–9.

Schilit, B., Adams, N., Gold, R., Tso, M. and Want, R., "The PARCTAB Mobile Computing System," Proceedings of $4^{th}$ Workshop on Workstation Operating Systems (WWOS–IV), Napa, California, pp. 34–39.

"Transcome–Transportable Computing Environment," IBM Technical Disclosure Bulletin, vol. 36, No. 12, Dec. 1993, p. 273.

*Primary Examiner*—Zarni Maung
*Assistant Examiner*—Saleh Najjar

[57] ABSTRACT

A system including any number workstations, file servers, printers and other fixed devices coupled in a network, and a number of portable devices carried by users and coupled to the network by infrared (IR) link. Each portable device emulates its user's personal satchel for documents: the device is programmed to receive transmit and store document references or tokens, each of which is associated with an electronic document stored in the database. Documents are distributed from one person to another by transmission of document references or tokens, and a document is sent to a printer by beaming that document's reference or token to an IR transceiver associated with that printer. The portable device is preferably a handheld or wristwatch computer with a graphical display for enabling the user to transfer documents, and the fixed devices preferably include a scanner/copier/printer having its own IR transceiver.

19 Claims, 12 Drawing Sheets

Mike          Richard $t_1$ $t_2$ $t_3$ $t_4$ $t_5$ $t_6$ $t_7$

SYSTEM AND METHOD FOR ACCESSING AND DISTRIBUTING ELECTRONIC DOCUMENTS

This application is a continuation of Application Ser. No. 08/493,376, filed Jun. 21, 1995.

FIELD OF THE INVENTION

This invention relates generally to data access and distribution, and more particularly to a system for transferring electronic documents between portable computer devices, and between such devices and various forms of office equipment.

BACKGROUND OF THE INVENTION

Electronic documents play an increasing role in our lives. Indeed nowadays many, if not most, documents are created electronically; and we take it for granted that electronic documents are easier to store, retrieve, copy, print, update and distribute than paper documents.

For desk-bound, document-intensive workers this may indeed be the situation, but for people whose jobs require them to be more mobile, existing technology does not greatly assist in such tasks. For a mobile worker, electronic documents are significantly less convenient to locate, read and distribute, and yet these activities appear to be the dominant document-intensive activities outside the office. When away from his office or workstation, perhaps at a meeting, a worker is rarely able to access all or most of his electronic documents, and he will often resort to carrying a bulky set of paper documents as a precaution, even though they may not in fact be needed for the meeting.

There are many situations in which a paper document is clearly the most effective medium for exchanging information. Sometimes the intended recipient has no immediate need for the information, but they see a potential need for it in the future. In this situation it seems preferable to exchange the document electronically. Nevertheless they are forced to carry the document back to their office or home, perhaps having first stopped off at a copier or printer to obtain it, and contribute to their stack of paper documents.

Although many documents are created electronically, a relatively small proportion of those documents are distributed electronically because electronic distribution is often beset with difficulties. For example, if a person, the sender, wants to give an electronic document to someone they are currently talking to, the recipient, the sender must break off the conversation, go to a workstation, search for the desired document, find out the recipient's electronic address, check how best to encode the data for the recipient's machine; and then transfer the document. Compared with simply handing over a paper document this process is disruptive, time-consuming and unreliable. Furthermore, rarely can the sender or the recipient immediately confirm that the document has been successfully transferred between them. To do so requires the recipient to go to his workstation, search for the document and explicitly acknowledge to the sender that the document was received.

Another problem arises even when a person decides to hand over a paper copy to the recipient. If he doesn't have a paper copy to hand, to avoid disruption he will often promise to sprint the document later and hand it over after the meeting has concluded, a task he may forget to perform. If it is decided to print out the document there and then, the person must break off from the conversation, find the electronic document, find a printer that isn't in use, send the document to the printer, and then remember to go and pick it up when printing is complete. However, people often forget to pick up their output; and if a confidential document has been printed on a network printer, the sender must ensure that he is on hand to collect it immediately.

A further problem exists for workers who are unable to gain access to their workstation or network: it is now commonplace for members of a committee to travel long distances to attend important meetings. For example, standards committees convene experts from all over the world; and participants try to arrive prepared with all the information they might need to present to their colleagues, respond to questions, or take decisions. Often the committee meets at one of several different locations each time: the European Parliament, for example, regularly moves between Brussels, Luxembourg and Strasbourg. It may be impossible for the attendees to anticipate the document needs, or they may not be able to afford to carry printed versions of everything. When a missing document is needed urgently, the situation can be remedied by a telephone call back to the office to someone who has access to the electronic document and can print it out or fax it to the meeting. At best this disrupts the flow of the meeting, and there is a risk that the document will not be received at all.

It is known to use infrared (IR) communication to transfer electronic documents from one portable computer to another during a meeting—e.g. the Apple® Newton. However, compared with existing electronic communications devices, the (IR) data transfer rate between such machines is very slow: to beam a simple electronic document from one to another, users may need to stand within a few feet of each other and point the IR transmitters of their machines at each other for several minutes.

A further problem is that it is not possible to store large numbers of electronic documents on a portable, hand-held or wristwatch computer. This is the case with documents in, e.g., PostScript, but may be an even greater problem with scanned (bitmapped) documents.

SUMMARY OF THE INVENTION

A system for accessing and distributing electronic documents electronically is described. The system includes a database, a document handling subsystem and at least one portable electronic document transport device. The database includes electronic documents and a document reference for each electronic document. The document handling subsystem is coupled to the database and allows manipulation of electronic documents and conversion of documents between electronic and paper form. The document handling subsystem includes a transceiver for receiving and transmitting a document references. The portable electronic document transport device enables easy remote access and exchange of electronic documents by transmitting and receiving document references. Like the document handling subsystem, the portable electronic document transport device also includes a transceiver for receiving and transmitting document references.

BRIEF DESCRIPTION OF THE DRAWINGS

The present invention will now be described, by way of example, with reference to the accompanying drawings, in which.

DETAILED DESCRIPTION

Figure 1:
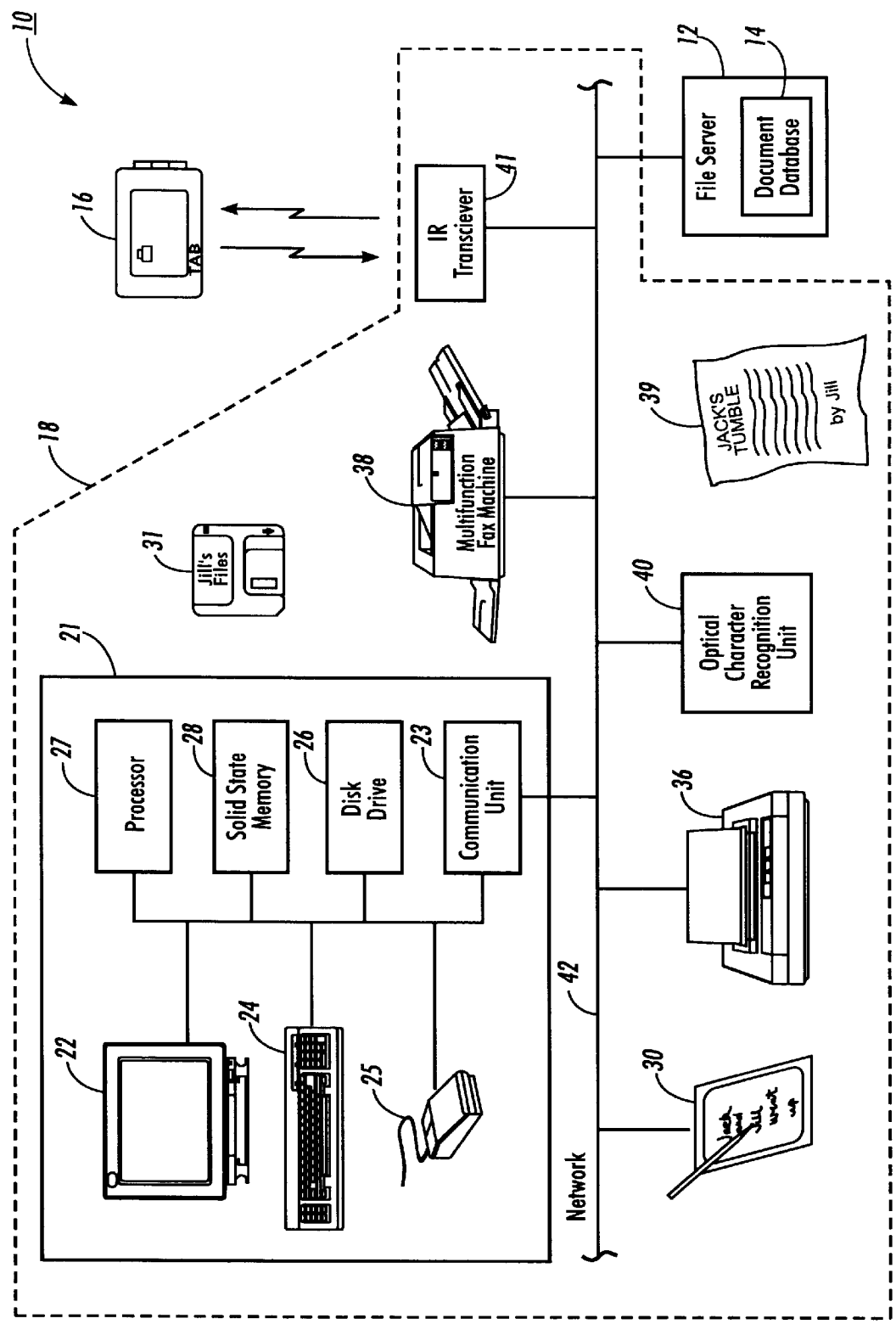
FIG. 1 illustrates a system for transporting and exchanging electronic documents according to the present invention.

FIG. 1 illustrates networked system 10 for accessing and distributing electronic documents. Briefly described, system 10 facilitates the exchange of electronic documents using document references which represent electronic documents. File server 12 maintains a database 14 that associates electronic documents with document references. These document references allow easy access and exchange of electronic documents, particularly using small portable electronic document transport devices 16. At some later time, the user of device 16 may transmit the document reference to a device within document handling subsystem 18 to obtain a copy of the document in the desired form, electronic or paper copy. System 10 of the present invention is based upon PARCTab technology; and the system hardware is described in detail in: (1) Adams N., Gold R., Schilit B. N., Tso M. & Want R., (1993), An Infrared Network for Mobile Computers, in *Proc. USENIX Symposium on Mobile & Location-independent Computing*, pp. 41–52, Cambridge, Mass.:USENIX; and (2) Schilit B. N., Adams N., Gold R., Tso M., Want R., (1993), The PARCTab Mobile Computing System, in *Proc. 4th Workshop on Workstation Operating Systems* (WWOS-IV), pp.34–39, Napa, Calif.: IEEE; all incorporated herein by reference.

The invention is particularly advantageous in that document references take up a comparatively small amount of storage space in memory, and their transmission from one (fixed or mobile) device to another may be accomplished in very quickly. The invention is also advantageous for the worker who visits numerous sites where documents are to be given to him: instead of collecting a bundle of papers, he collects a string of documents references in his portable electronic document transport device.

I. System Overview

Given that brief description, consider now in detail the various parts of system 10. Document handling subsystem 18 includes many typical types of office equipment: personal computer 21, also called work station 21, printer 36, multifunction fax machine 38, optical character recognition unit 40, and infrared transceiver 41, all communicating via network 42. Personal computer 21 includes monitor 22 for visually displaying information to a computer user. Communication unit 23 communicates with network 42 thereby enabling the transformation of a document from electronic form to paper form using printer 36 or multifunction fax machine 38. Personal computer system 21 provides the computer user multiple avenues to input data. Keyboard 24 allows the computer user to input data to personal computer 21 by typing. By moving mouse 25 the computer user is able to move a pointer displayed on monitor 22 and to select displayed icons. The computer user may also input information to personal computer 21 by writing on tablet 30 with a stylus or pen. Alternately, the computer user can input data stored in machine readable form on a magnetic medium, such as floppy disk 31, by inserting the disk into floppy disk drive 26. Processor 27 controls and coordinates the operations of personal computer 21 to execute the commands of the computer user. Processor 27 determines and takes the appropriate action in response to each user command by executing instructions stored electronically in memory. Typically, operating instructions for processor 27 are stored in solid state memory 28, allowing frequent and rapid access to the instructions. Semiconductor memory devices that can be used to realize memory 28 include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

Optical character recognition unit (OCR unit) 33 permits the computer user to input hardcopy documents, such a document 39 into system 10, which OCR unit 33 then converts into a coded electronic representation, typically American National Standard Code for Information Interchange (ASCII).

Fileserver 12 stores a document database 14 accessible to document handling subsystem 18 via network 42. Database 14 associates each electronic document with a document reference, or token. The electronic documents themselves may be stored on file server 12, or on a personal workstation 21 within network 10. Document references take the form of an electronic token which uniquely corresponds to a document. While each document reference corresponds to a single electronic document, a document may have any number of corresponding document references (e.g., originating from different users). In some cases the token may contain the document, when the document is very tiny, for example. A typical database of stored documents and respective tokens is illustrated in Table 1. The tokens are shown as 8-bit codes for the purpose of illustration only; and it will be appreciated that the tokens may have any suitable format to suit a desired application. In any event, the token contains sufficient information for the system to locate the relevant document, as in the case of URLs. A URL (uniform resource locator) is essentially a way for the World-Wide Web to specify where a particular resource (e.g. document) is located on the Internet, while at the same time describing the tool that is required to access it and specifying the actual file's location on a particular internet host. (See Berners-Lee T. J., Cailliau R., & Groff J. -F., *The Worldwide Web,*

Computer Networks and ISDN Systems 25 (1992), pp. 454–459. North-Holland; and Mangers J. J, *World-Wide Web, Mosaic and More* (1995), McGraw-Hill, London; all incorporated herein by reference). The situation whereby files on a local machine may be embedded with subdirectories and may exists on different physical disk drives is true the Web also, except that all of this applies to a particular machine on the internet, of which there are hundreds of thousands. Since each machine's file locations differ widely, URLs are used to identify where they reside. In general URLs take the form:

http://www.ncsa.uiuc.edu/Mosaic/Demo/demo.html

Many resource types are now available, including in particular ftp for a FTP (File Transfer Protocol) server—the main method of moving files around on the internet. URLs allow a document to link with other services and documents on the internet.

TABLE 1

Typical documents and tokens in a database

| Document | Token |
| --- | --- |
| 5000 Series machine specifications | 01011010 |
| 5045 Maintenance Manual | 01101001 |
| Agenda | 00101011 |
| . . . | . . . |
| ODP sales pie charts | 00010111 |
| 5053 Production schedule | 01011110 |

Transceiver 41 enables wireless communication between any portable electronic document transport device 16 in the vicinity of document handling subsystem 18. Although only one transceiver 41 is shown in FIG. 1, document handling subsystem 18 may include many transceivers. Preferably, transceiver 41 is a bidirectional 19.2Kb/s infrared (IR) transceiver. It will be appreciated that the wireless communication between document handling subsystem 18 and Tab 16 may alternatively be implemented via suitable radio technology well known in the art. For example, see Weiser M., The Computer for the 21st Century, *Scientific American*, September 1991, pp. 66–75; incorporated herein by reference. As another alternative, communication between Tab 16 and document handling subsystem 18 may be implemented by wired links, where appropriate.

Portable electronic document transport device 16, also called Tab 16, allows easier distribution of documents within system 10 and between systems by storing and distributing document references. Tab 16 is a form of personal digital assistant, PDA—a small lightweight portable computer that can be attached to the belt, or carried in a handbag. The following discussion of network 10 describes the use of Tabs; however, it will be appreciated that any suitable form of portable computer may be used, and the computer may take the form, for example and subject to design constraints, of a conventional wristwatch. It will also be understood that as a computer, Tab 16 includes a processor and solid state memory, even though these are not illustrated, and that these operate in the same manner as discussed with respect to personal computer 21. An exemplary system, for transferring data such as document references to and from a wristwatch computer, is disclosed in British patent application No. 9425184.0, incorporated herein by reference.

Figure 2:
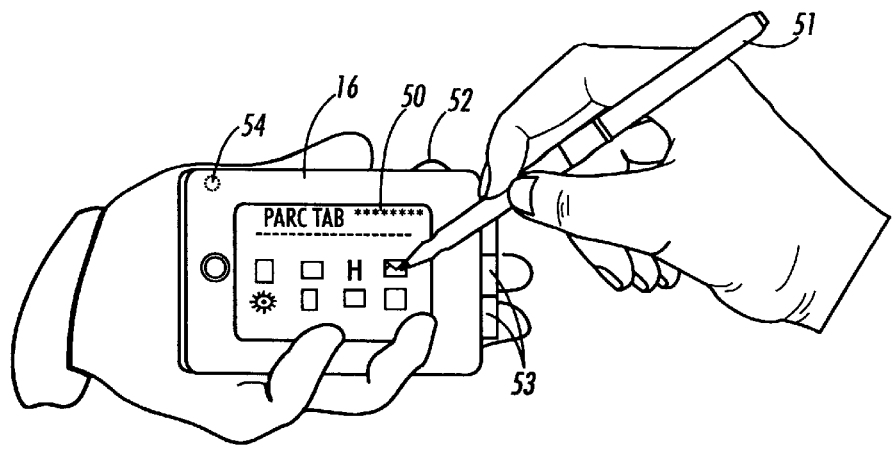
FIG. 2 is a view of the portable electronic document transport device according to one embodiment of the invention.

FIG. 2 illustrates Tab 16. Tab 16 includes a small bitmap screen 50 which is touch sensitive, allowing user input by means of finger tip or pointer 51. Tab 16 also includes a transceiver compatible with those of document handling subsystem 18. Preferably, tab 16 includes 19.2 Kb/s bidirectional IR transceiver 52 and three buttons 53. Tab 16 further includes a tone generator 54 for use, for example, over the public telephone network. Within a building, users can carry their Tabs 16 from room to room, while maintaining contact with document handling subsystem 18, which provides a wide variety of services. Preferably Tab 16 includes a user interface through which various icons 55 are displayed on screen 50 to provide to the user access to such services, as is well known in the art. For example, see Smith et al., Designing the Star User Interface, *Byte* 7(4) (1982), pp. 242–282.

II. User Interface

Preferably, system 10 includes a user interface in which each electronic document or document reference has a corresponding graphical representation. The UI representation of the electronic document may comprise in particular an icon or text on a graphical display, a sound, any combination of these, or, broadly, any real or ephemeral object capable of being selected by means of the user interface. The UI command language may be text- or menu-based, or natural language or direct interaction (as in the embodiment described herein), or may use any other suitable method (see Preece J., *Human Computer Interaction* (1994). Addison Wesley).

Preferably, the user interface of system 10 builds on the conventional desktop model by adding a document satchel to model the transportation of document references. The notion of a satchel is that of a portable holder of documents, enabling transport of the documents to a remote location for later use, distribution, etc. Although in the following an electronic document will be said to be stored in a satchel, a feature of the present invention is that it is an document reference, which identifies the electronic document, which is received by, stored on, and transmitted by the Tab.

Alternatively, according to the invention, each document reference for an electronic document may be invalidated or even absent (e.g. through deletion): the electronic document remains in the database, but remote access to it using document references/document satchel technology described herein is precluded.

As an alternative, the user interface may be fully or partially omitted from PDAs 16, PDAs 16 in that case being designed, e.g., to reproduce a suitable user interface when in the vicinity of, and in communication with, a suitable device (e.g., workstation, printer, copier, fax machine, etc) having its own display. In such a case, PDA 16 may be programmed to emit a 'beep' from its tone generator to indicate transmission and/or receipt of a document; although here the person who has had an electronic 'document' sent to his PDA is unable immediately to determine what the document is.

Figure 3:
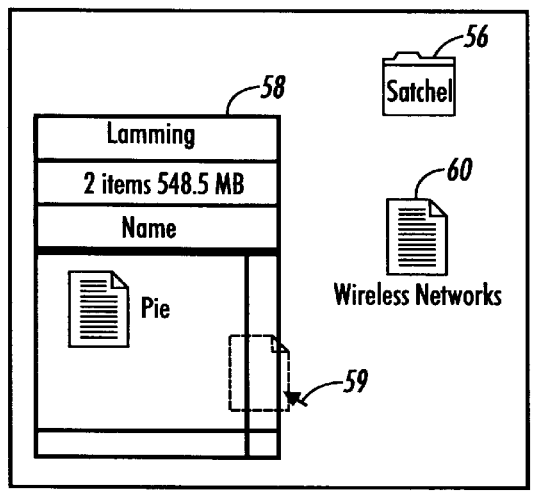
FIG. 3(a) shows diagrammatically the user interface and icons employed in one embodiment of the invention for a user's workstation.
FIG. 3(b) shows diagrammatically the user interface and icons employed in one embodiment of the invention for the user's portable electronic document transport device.
Figure 3:
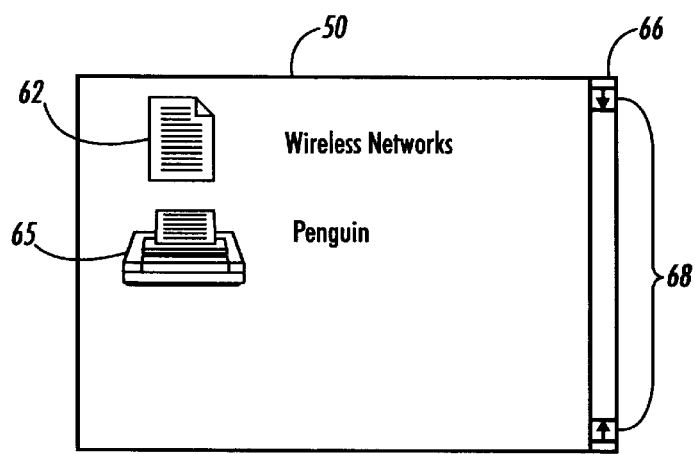

FIGS. 3(*a*) and 3(*b*) show diagrammatically the user interface and icons employed in one embodiment of the invention. FIG. 3(*a*) shows the user interface and icons when displayed on monitor 22 of a user's workstation. FIG. 3(*b*) shows the user interface and icons which displayed on the display the user's portable electronic document transport device 16, so as to represent the contents of his satchel. A person skilled in the art will appreciate that any user interface, icons and/or process for transferring documents from the electronic desktop over the IR link may be employed.

Electronic documents may placed into the user's satchel using his personal workstation 21, e.g. a Macintosh. As shown in FIG. 3(*a*) satchel owners have on their electronic desktop a special small folder icon, called Satchel 56, which is preferably visually distinguishable from other folders on the desktop. Satchel 56 behaves much like any other folder. When opened, Satchel window 58 shows the user's name and a list of items enclosed in satchel 56. A difference between satchel 56 and other folders on a personal computer desktop is that any document 60 placed into the satchel 56 by a user, perhaps using a conventional mouse and pointer 59 to drag the document, automatically initiates a data transfer operation between workstation 21 and the user's Tab 16. The information transferred/transmitted includes the icon type, document name, and the corresponding token, the token being stored in the satchel; i.e. Tab memory. This transfer may be accomplished by means of IR communication, for example, though other ways of accomplishing such a data transfer may be used. Moving a document icon 60 into satchel 56 causes the document icon 62 to appear appearing in the satchel window on the Tab display 50. The information transmitted over the IR link includes the icon type, document name, and the corresponding token, the token being stored in the satchel.

Preferably, the tab's user interface is implemented in such a way that the satchel contents are displayed on screen 50 as a series of one line entries, each line corresponding to a document token and including a small icon and the name of the document. For example, as shown in FIG. 3(b), screen 50 displays document icon 62 for a document named "Wireless Networks" and a printer icon 65 for a printer named "Penguin." Down the right hand edge of display 50 is a scroll bar 66 enabling a user to scroll up or down by pressing (e.g. a pen) on the appropriate arrow 68 of the scroll bar, until the desired entry is found.

In a similar manner, as shown in FIG. 3(a), any document appearing in the Tab satchel automatically appears in satchel folder 58 on the desktop of the user's work station 21, provided the Tab 16 has been within range of an IR transceiver coupled to his workstation, so as to enable the relevant satchel contents data to be downloaded to the workstation. From there, documents in the satchel folder can be opened and edited in situ, or they can be dragged out of the the satchel folder and onto the desktop.

Because Tab 16 preferably uses a wireless IR transceiver it is easy to discover which other IR-linked devices are within its line of sight. The PARCTab network disclosed in the above-mentioned references (1) & (2) includes IR gateways, one per room, that provide the satchels with a link to the cable network services upon which they rely. However, any suitable location technique can be used to determine where the satchel is. Consequently, each satchel is context-sensitive: each one knows which room it is in at any instant, and which other satchels or IR-linked devices (e.g. printers) are there with it.

Each satchel presents this context information to the user, and it takes the form of additional entries on the satchel screen. These entries are not input by the user, but pop up automatically as the user moves around the building carrying his satchel. So, for example, when Mike meets Richard, an entry representing Richard appears in Mike's satchel, and a corresponding entry representing Mike appears on Richard's. Similarly, when Mike is in the same room as a printer, an entry (icon 25+name) showing the name of the printer appears in his satchel (see FIG. 2(b)). These pop-up entries provide a streamlined way for users to pass documents to each other, or to exchange them with nearby devices.

III. Exchanging Documents in the System

Figure 4:
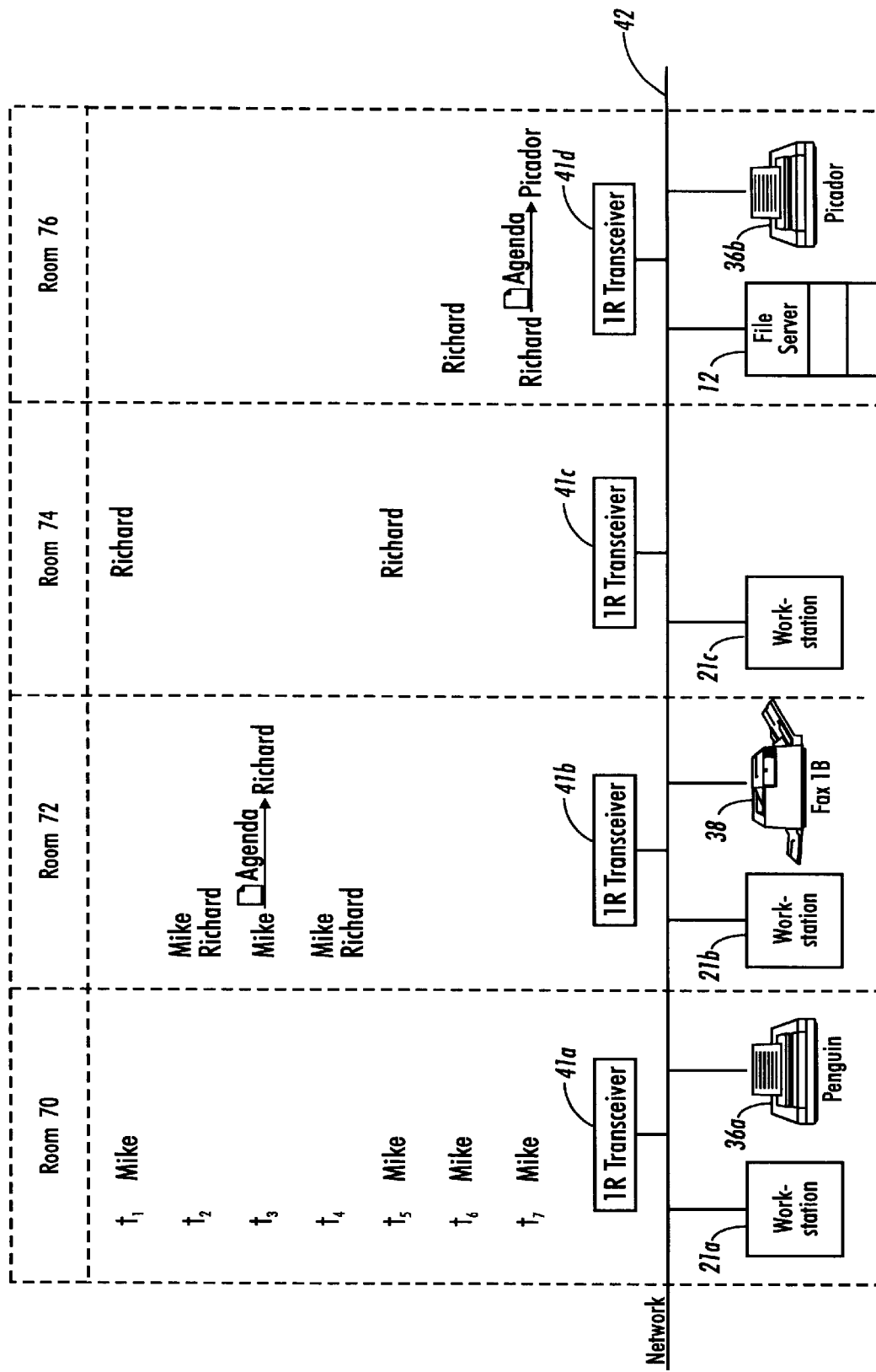
FIG. 4 illustrates the movement of an electronic document in time within a system including multiple sites.

FIG. 4 illustrates a sequential procedure by which a document is distributed within system 10 using document satchels. Within system 10 a conventional network 42 (e.g. ethernet) enables communication between a number of conventional office devices coupled to network 42, such as workstations 21a, 21b, and 21c, printers 36a and 36b, multifunction fax machine 38, and file server 12. For the purpose of illustration, that part of network 42 connecting four rooms is shown; for example, rooms 70 and 72 may be in a first building, while rooms 74 and 76 may be in a second building, remote from the first.

Each room 70, 72, 74, and 76 includes at least one IR transceiver 41 to enable communication between Tabs 16 present in the room (see the above-mentioned Schilit et al. references). Alternatively, any of the office devices, 21, 36, 38, or 40 may incorporate its own IR transceiver for communication with Tabs. As illustrated in FIG. 4, room 70 contains workstation 21a, printer 36a and transceiver 41a and room 76 includes file server 12, printer 36b and transceiver 41d, and soon.

Figure 5:
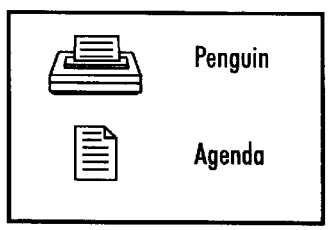
FIG. 5 shows successive displays on the portable electronic document transport device of each user corresponding to the sequence of events in FIG. 4.
Figure 5:
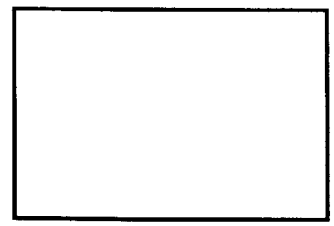
Figure 5:
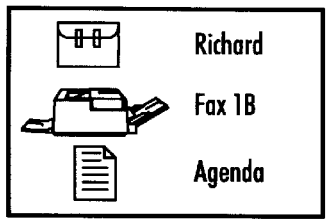
Figure 5:
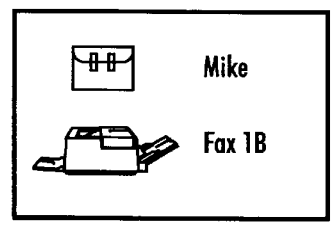
Figure 5:
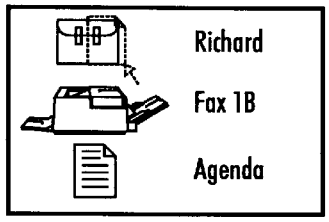
Figure 5:
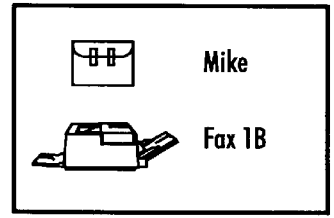
Figure 5:
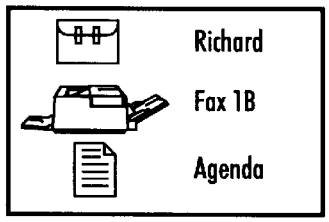
Figure 5:
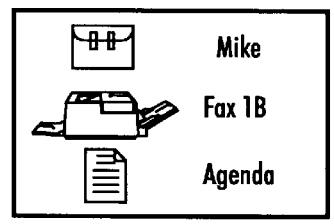
Figure 5:
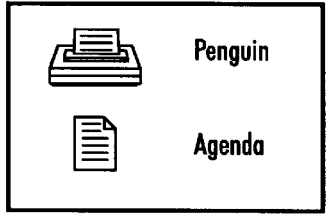
Figure 5:
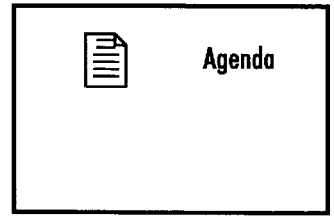
Figure 5:
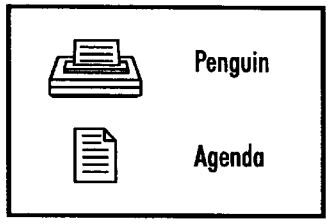
Figure 5:
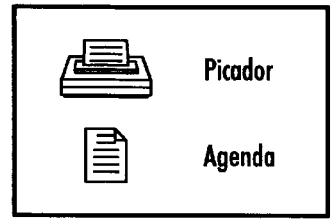
Figure 5:
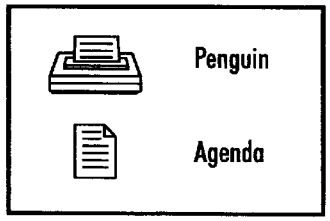
Figure 5:
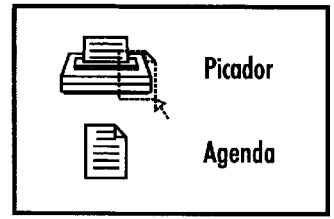

In FIG. 4, the document distribution process is illustrated by showing the positions of the Tabs 16 of two people, Mike and Richard, and the operations which are performed, at intervals before and after their meeting in one of the rooms. FIG. 5 illustrates the displays on Mike and Richard's Tabs 16 at times $t_1$–$t_7$ during the process of FIG. 4.

At time $t_1$, Mike is in his office, room 70, and Richard is in room 72. As shown in FIG. 5, at $t_1$ Mike's satchel on his desktop displays the icon for the document "Agenda." Thus, Mike's Tab memory stores the document token for "Agenda." Mike's desktop satchel also displays the icon for his printer, called "Penguin", which appears automatically because printer Penguin 36a is located in room 70. Next, at time $t_2$, Mike and Richard meet in room 72. At that time the icon for the Penguin printer disappears automatically from Mike's Tab satchel display and the icon for Richard's satchel appears in Mike's satchel. Similarly, the icon for Mike's satchel appears in Richard's Tab satchel. In addition, the icon for multifunction fax machine 38 automatically appears in both satchels.

At time $t_3$, Mike decides to pass a copy of the electronic document "Agenda" to Richard. (If, say, Mike does not have the document he wants to pass on in his satchel, he may employ a memory aid and information retrieval system provided on his Tab, as disclosed in published European patent application EP-A-637,807, corresponding to U.S. application Ser. No. 08/279,961, in order to locate the document he wants and retrieve it's token.) To pass a copy of the electronic document "Agenda" to Richard, Mike simply selects the document icon on the touch screen of his tab 16 using a pen or the like, and copies the icon onto Richard's satchel icon displayed on his screen 50. This initiates a process wherein the digital document token (see Table 1) for "Agenda" is beamed over the IR link from Mike's Tab to Richard's Tab. (The time taken for this will depend on the communication protocol used, the use of security encryption, and the size of the token, but in any event is likely to be a very small fraction of the time which would be needed to transfer the entire document via the same link, and typically the time taken will be a fraction of a second.) Thus the token for "Agenda" is stored on Richard's Tab for later distribution or use. When this operation is completed at $t_4$, the icon for "Agenda" also appears on the screen of Richard's Tab: it is now in his personal satchel.

Next at $t_5$, Mike returns to room 70 and his satchel display reverts to that existing at $t_1$, which is described above. At the same time Richard returns to room 74. As a result of these movements the icons for Mike's satchel and fax 38 automatically disappear from Richard's Tab screen, so that the only item left in his satchel is the document "Agenda," as shown in FIG. 5. Richard now decides that he would like to print out "Agenda", but doesn't have a printer in his office. At $t_6$, therefore, he walks into room 76 in the same building, which houses the printer 36b called "Picador." The icon for Picador automatically appears as an entry on Richard's Tab screen as a result of the IR communication and object sensing procedure discussed above.

To print out "Agenda", Richard, at time $t_7$, simply moves (using a pen to move the pointer on his touch screen) a copy of the icon for "Agenda" onto the Picador icon. As a result, an IR signal is beamed from Richard's Tab to transceiver 41d, the signal including the digital document token for "Agenda". Using the token, the electronic document "Agenda" is fetched from 14 database in which is stored in file server 12, from another location within system 10, or from Mike's workstation 21a. and then printed out on Picador 36b. In one embodiment, Picador 36b may be a "confidential" printer, in which case the document is not printed straight away, but the print operation is deferred. Then, the next time Richard is in the vicinity of Picador 36b, Richard's TAB 16 and Picador 36b sense this, via IR communication, the print operation is commenced by Picador; and Richard's TAB emits an audible "beep" to tell him to collect the freshly printed document immediately upon printing.

In an alternative embodiment, Richard may submit the document "Agenda" for a third party service, such as summarising, and/or translation service), available on network 42; and does so by dragging and dropping the icon for "Agenda" onto a corresponding icon for that service on the TAB screen.

FIGS. 6(a), 6(b), 6(c), 6(d), 6(e), 6(f) and 6(g) show schematic representations of various procedures for distributing documents which may be performed using the present invention. In these figures multifunction fax machine 38 is coupled to network 42 to facilitate rapid transfer of electronic documents with other devices on net 42. Multifunction fax machine 38 may provide any combination of the functions of scanning, copying, faxing and printing, as is known in the art. Multifunction fax machine 38 includes IR communication facilities for wirelessly communicating with tabs, base stations in rooms, and any of the other objects mentioned above which are within range of its IR transmitter at a given time.

Figure 6A:
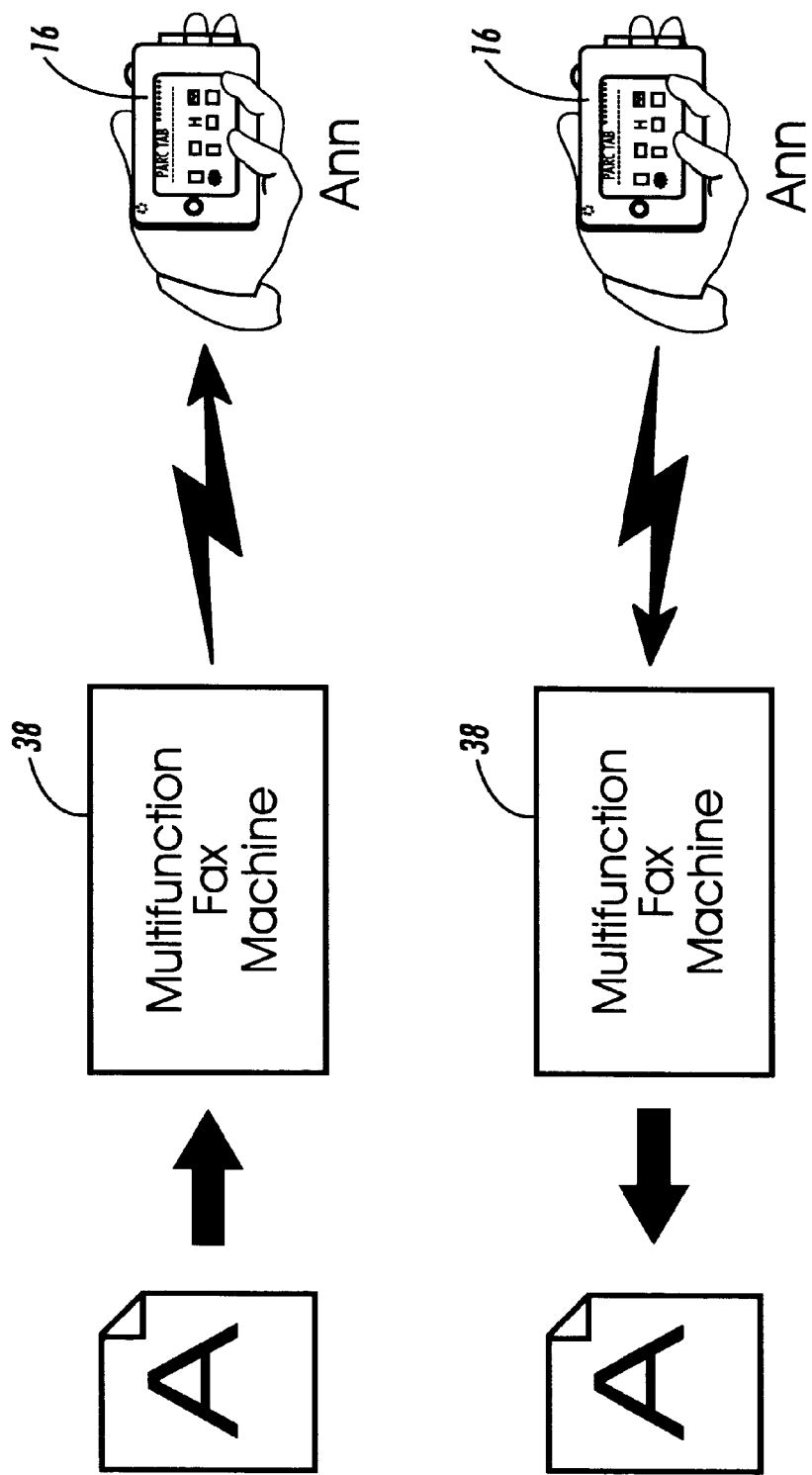
FIG. 6(a) illustrates the exchange of an electronic document between Ann's portable electronic document transport device and a multifunction machine.
Figure 6:
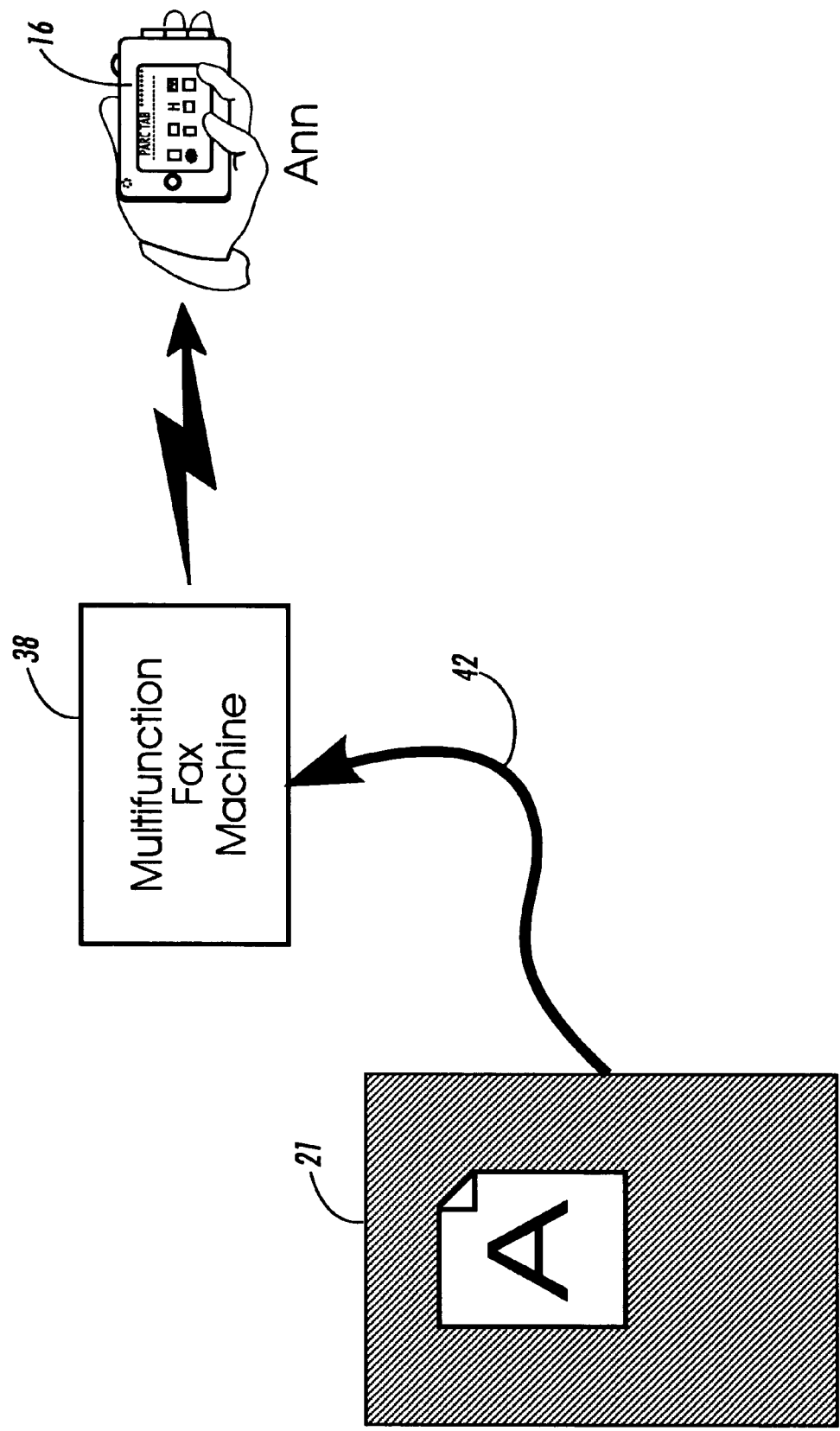
FIG. 6(b) illustrates the movement of an electronic document from a personal computer to a multifunction machine and from that device to Ann's portable electronic document transport device.
FIG. 6(c) illustrates the movement of an electronic document by Ann via two coupled office machines.
FIG. 6(d) illustrates the exchange of an electronic document between Ann and Bob.
FIG. 6(e) illustrates the exchange of an electronic document using two machines linked through the telephone network.
FIG. 6(f) illustrates the exchange of an electronic document as in FIG. 6(e) with the addition of an IR transceiver.
FIG. 6(g) illustrates the exchange of an electronic document using radio paging technology.

As can be seen in FIG. 6(a), document A is initially scanned by the multifunction machine 38 and its corresponding token is beamed by IR to Ann's Tab 16, and the relevant icon appears in her satchel. Some time later when document A is not available, Ann beams the document token to multifunction fax machine 38, which automatically prints out document A.

In FIG. 6(b), document A has been created on a user's conventional workstation 21. The user then sends the electronic form of document A to multifunction fax machine 38, which then beams by IR the corresponding document token to Ann's Tab 16.

Figure 6C:
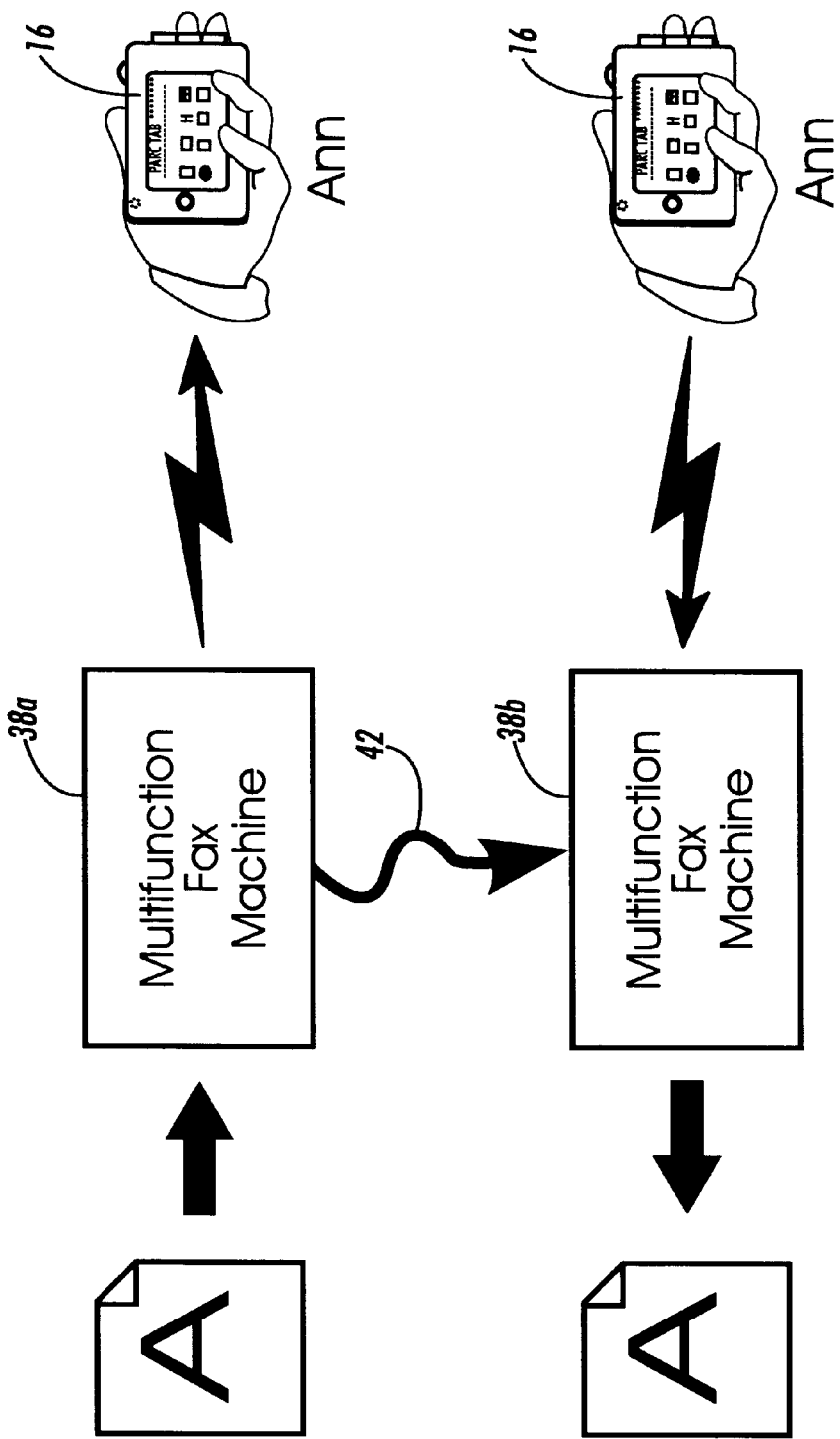
Figure 6:
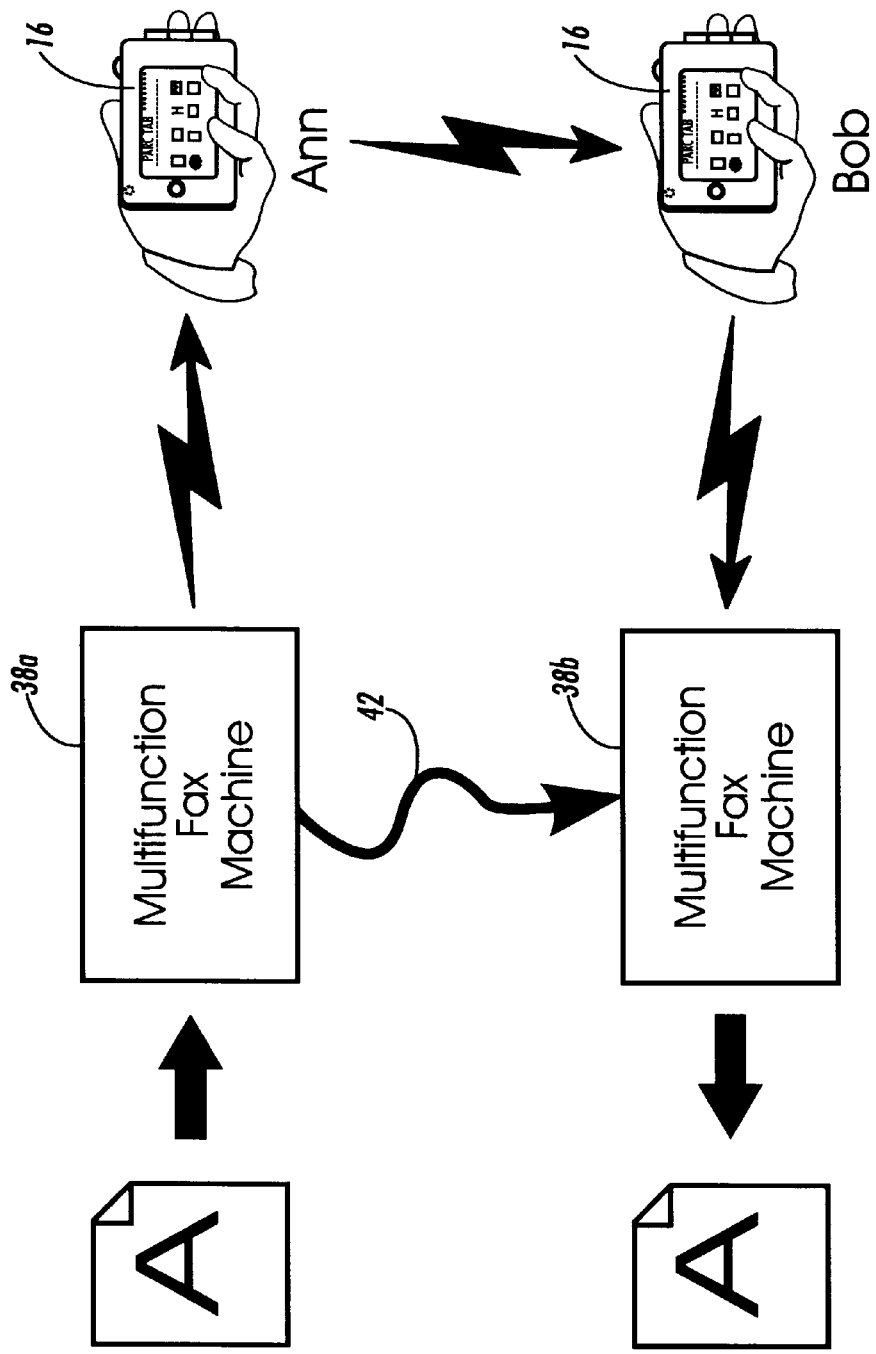

Referring to FIG. 6(c), here two multifunction machines 38a and 38b are coupled together via network 42. Initially document A is scanned in on machine 38a which beams the associated document token to Ann's tab 16. Some time later and, for example at a remote location, Ann decides she wants a hard copy of document A. She simply beams the document token to nearby multifunction fax machine 38b. Multifunction fax machine 38b thereupon retrieves the electronic document A over network 42 from multifunction fax machine 38a or an associated file server 12, and then prints out document A.

The distribution and printing of document A is again illustrated in FIG. 6(d). The process is the same as in FIG. 6(c), except that the token is beamed from Ann to Bob for the latter to print out the document A on the second machine 38b. In an alternative embodiment, the document token for document A may be characterised such that Ann is able to receive and transmit it, but not to obtain access to the document itself, e.g. by printing. In this way, Ann is able to "trade" in a document which is inaccessible to her: she can thus act as a courier for confidential documents.

Figure 6E:
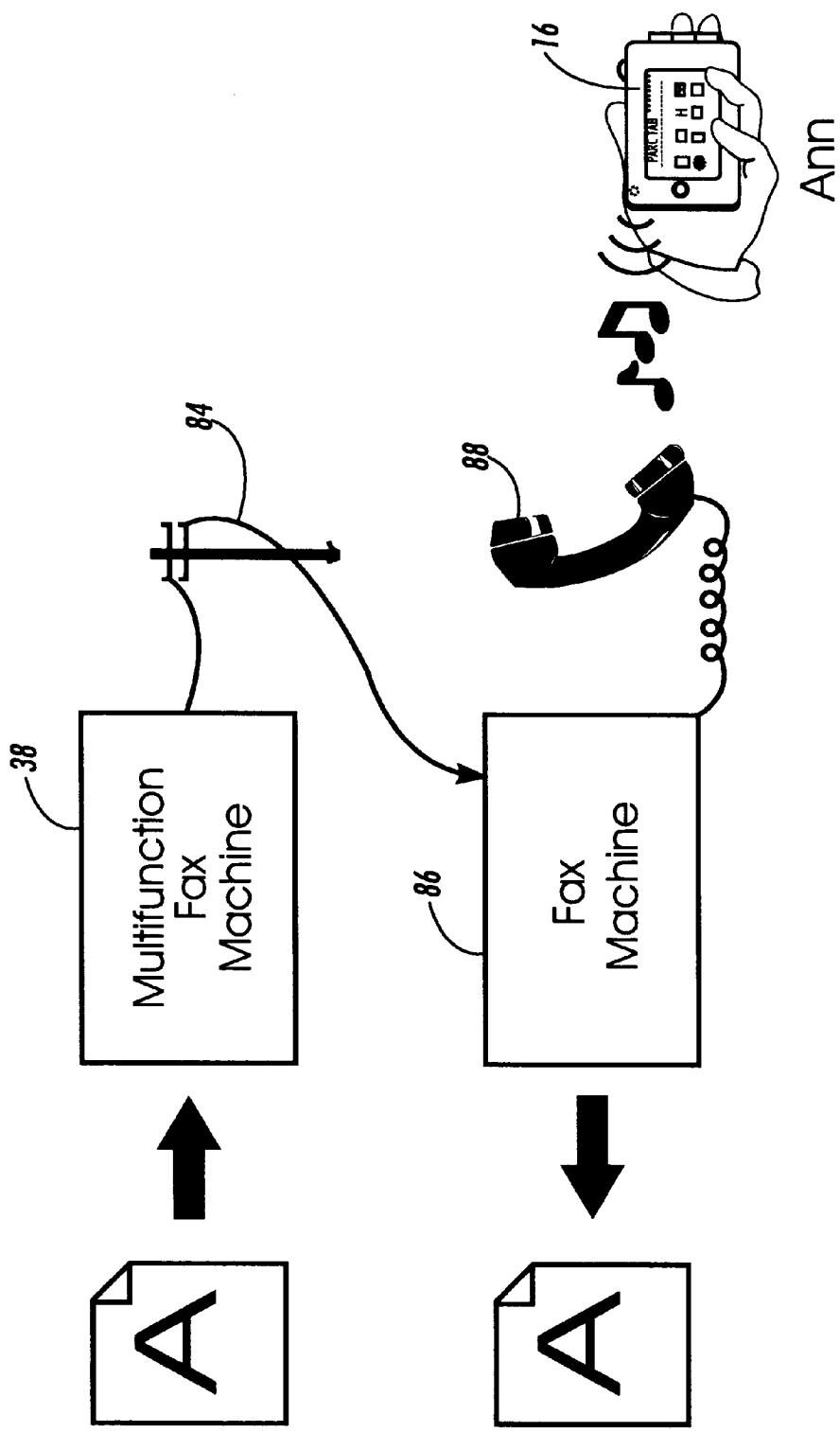
Figure 6:
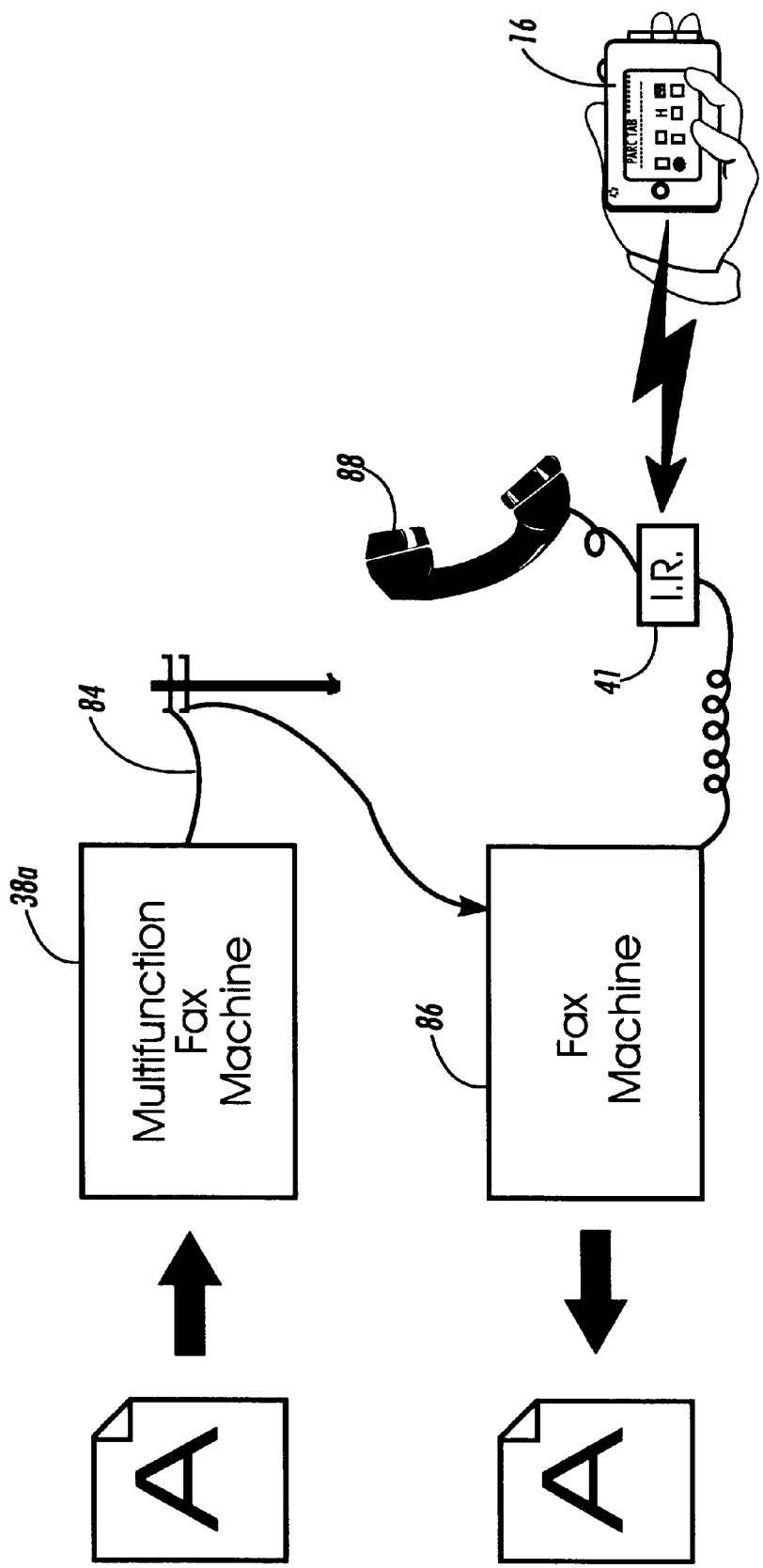
Figure 6:
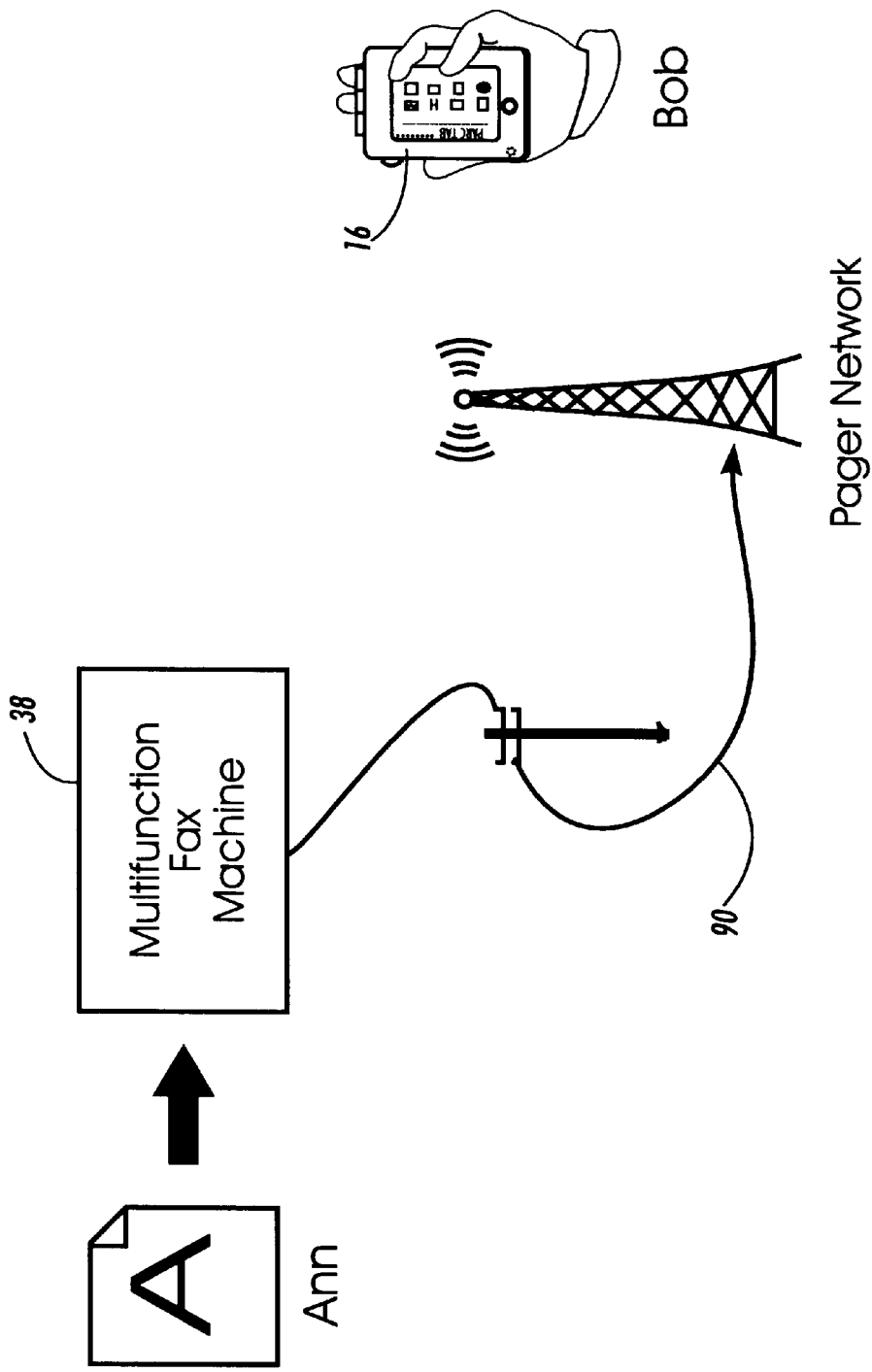

In FIG. 6(e), the case where the Tab owner is not in the vicinity of a multifunction fax machine 38 is illustrated. Here multifunction fax machine 38 is linked to fax machine 66 over telephone network 84. Document A has been scanned in and stored electronically in a database accessible by multifunction fax machine 38. Later, Ann is at a location where she needs a hard copy of document A and has access to fax machine 86. Using fax machine 86 she dials up multifunction machine 38 and, upon gaining access, she operates her Tab 16 to transmit to telephone 88 a tone signal representing the token for document A and commanding multifunction fax machine 38 to transmit document A to fax machine 86. Multifunction fax machine 38 promptly accesses document A in electronic form and sends it via telephone network 84 to fax machine 86 where it is printed out.

The same operation is illustrated in FIG. 6(f), with the exception that in this case fax machine 86 is equipped with its own IR transceiver 41, enabling the document token for document A to be beamed by IR from Ann's Tab 16 to transceiver 41 and then electronically conveyed from the fax machine 86 to multifunction fax machine 38.

The embodiment illustrated in FIG. 6(g) makes use of radiopaging technology. Bob is equipped with a portable electronic document transport device, i.e. a radiopager or a Tab 16 which emulates a radiopager, and while away from his office contacts Ann to let her know that he requires a copy of document A. Ann scans in document A using multifunction fax machine 38, and then commands it to transmit the document token for document A over pager network 90 to Bob's portable electronic document transport device. Bob is then able to go to any printer, fax, etc adapted to receive document tokens, and to print out a copy of document A.

IV. Tab Software

Figure 7:
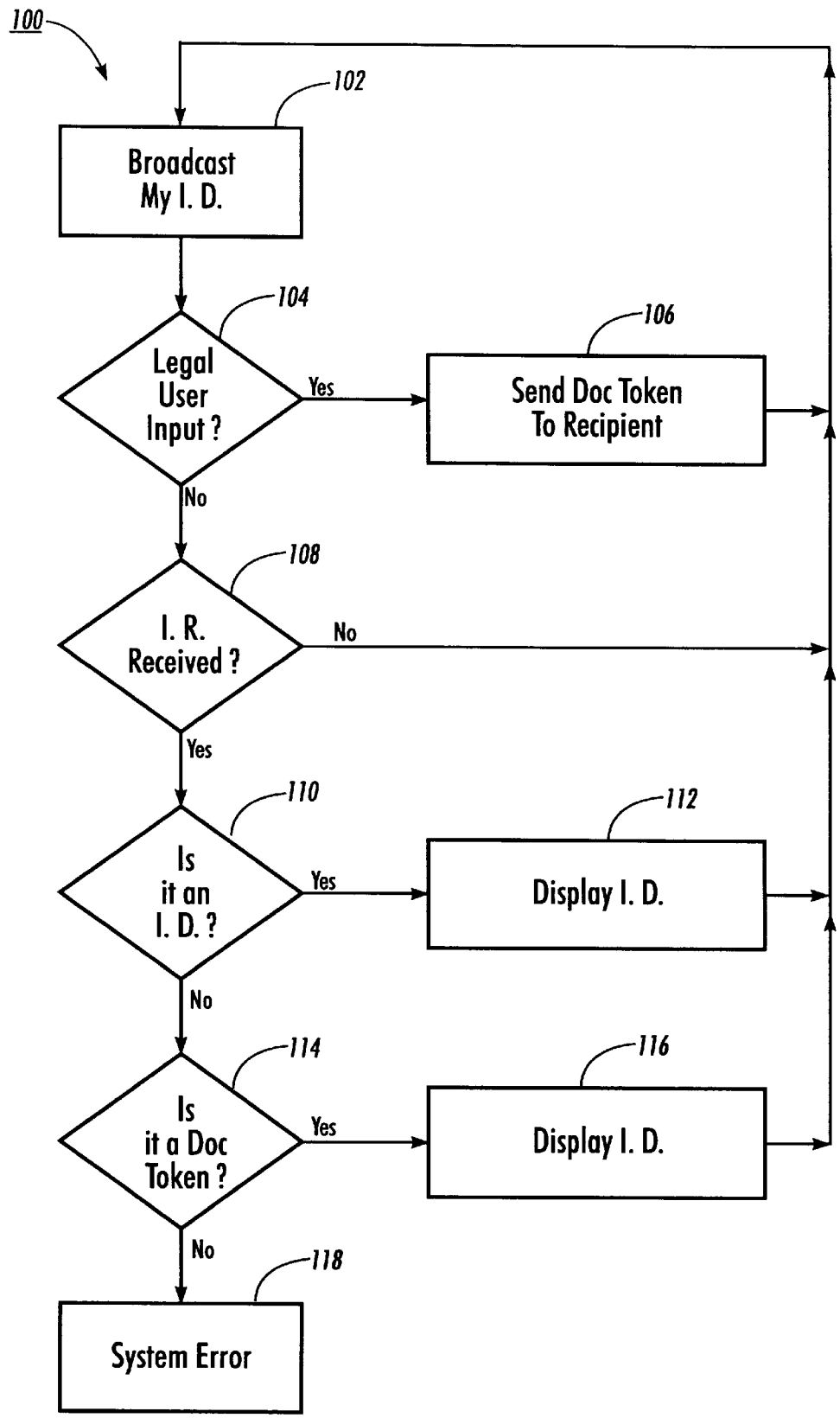
FIG. 7 is a flow chart of the process carried out in a portable electronic document transport device in exchanging a document token.

FIG. 7 illustrates in flow diagram form instructions 100 executed by each Tab 16 to communicate with IR-linked devices. Instructions 100 are stored in electronic form within Tab memory and executed by the Tab processor. Instructions 100 may be realised in any suitable programming language.

Executions of instructions 100 begins with step 102. During step 102 the processor initiates the broadcast of the tab user's identity code to the environment. (This code may be encrypted using shared key technology which is known in the art.) The Tab processor then advances to step 104. During step 104 the Tab processor checks for a legal (valid) user input, for example the user copying a document icon to another satchel, or other device, using the touchscreen. If such a legal input is received, the Tab processor branches from step 104 to step 106. During step 106 the Tab processor directs the transmission of the selected document token by IR to the recipient. The Tab processor then returns to step 102. (The token transmission may include encryption using shared key technology which is known in the art, i.e. anything which has been encrypted with a user's private key can only be decrypted using the public key corresponding to that private key.)

On the other hand, if the Tab processor determines during step 104 that no legal input has been received, then the Tab processor branches to step 108. During step 108 the Tab processor checks to see whether any IR signal has been received. Such a signal might represent a satchel ID, a printer ID, or a document token. If none has been received, then Tab processor exits step 108 and returns to step 102.

On the other hand, if an IR signal has been received, Tab processor advances to step 110 from step 108. During step 110 the Tab processor checks to see whether the IR signal just received is a satchel ID. If so, then during step 112 the Tab processor displays the received ID on the tab screen. (Again this ID code may need to be decrypted using shared key technology which is known in the art.) Afterward, the Tab processor exits step 112 and returns to step 102.

If the signal is not an ID, then the Tab processor advances instead to step 114 from step 110. During step 114 the Tab processor checks whether the received IR signal represents a document token. If not, then there is a system error, and this is indicated on the Tab screen during step 118. If the received IR signal is a document token, then the Tab processor causes the document icon corresponding to the token (i.e. icon+document name) to be displayed on the tab screen during step 116. (Again this ID code may need to be decrypted using shared key technology which is known in the art.). As usual, the Tab processor then returns to step 102.

Numerous further embodiments will be apparent to persons skilled in the art. For example, the satchel may be implemented using a (GSM) portable coupled to a PCMCIA cellular data card which can be plugged into a palmtop or notebook computer. Alternatively, the satchel functionality may be incorporated into a pager or mobile phone.

What is claimed is:

1. A system for communicating with a portable electronic document reference transport device, the portable electronic document reference transport device having a memory for storing document references, said system comprising:

a wire-based network for providing a communications link between devices coupled thereto;

a transceiver coupled to said wire-based network for establishing a wireless communications link with the portable electronic document reference transport device and devices coupled to said wire-based network;

a subsystem coupled to said wire-based network and communicating with said transceiver; said subsystem being adapted to operate a database that associates electronic document references with electronic documents; each electronic document reference identifying a location of a single electronic document stored in a memory on a device operating on said wire-based network; said subsystem receiving, from said transceiver, a communication originating from the portable electronic document reference transport device; the communication including an electronic document reference that is associated with a selected electronic document and a request for a service provided by a device coupled to the wire-based network that is to be performed on the selected electronic document.

2. The system according to claim 1, wherein the communication said subsystem receives from said transceiver is context sensitive.

3. The system according to claim 2, wherein the context sensitive communication said subsystem receives from said transceiver identifies a device on which to perform the requested service.

4. The system according to claim 1, wherein each electronic document reference specifies a host file server and location on the host file server of an electronic document.

5. The system according to claim 1, wherein the service provided by the device coupled to the wire-based network is a fax service.

6. The system according to claim 1, wherein the service provided by the device coupled to the wire-based network is a print service.

7. The system according to claim 1, wherein the service provided by the device coupled to the wire-based network is a summarizing service.

8. The system according to claim 1, wherein the service provided by the device coupled to the wire-based network is a translation service.

9. The system according to claim 1, wherein the service provided by the device coupled to the wire-based network is an optical character recognition service.

10. The system according to claim 1, further comprising a fax machine coupled to said network for creating hardcopies of the selected electronic document associated with the electronic document reference.

11. The system according to claim 1, further comprising a printer coupled to said network for creating hardcopies of the selected electronic document associated with the electronic document reference.

12. The system according to claim 1, further comprising a scanner coupled to said network for creating hardcopies of the selected electronic document associated with the electronic document reference.

13. The system according to claim 1, wherein said transceiver is an infrared transceiver.

14. The system according to claim 1, wherein said transceiver communicates with the portable electronic document reference transport device over a paging network.

15. The system according to claim 1, wherein said transceiver communicates with the portable electronic document reference transport device over a public telephone network.

16. The system according to claim 15, wherein said transceiver communicates with the portable electronic document reference transport device using the GSM mobile network standard.

17. The system according to claim 1, wherein the communication originating from the portable electronic document reference transport device is authenticated using shared keys.

18. The system according to claim 1, wherein the memory available on the portable electronic document reference transport device is significantly less than the memory available on devices, which are coupled to said wire-based network, for storing electronic documents.

19. The system according to claim 1, wherein electronic documents of associated document references are stored on a file server coupled to said wire-based network.

\* \* \* \* \*